A. W. REEKS.
PLANT SETTER.
APPLICATION FILED SEPT. 23, 1918.
1,288,194. Patented Dec. 17, 1918.
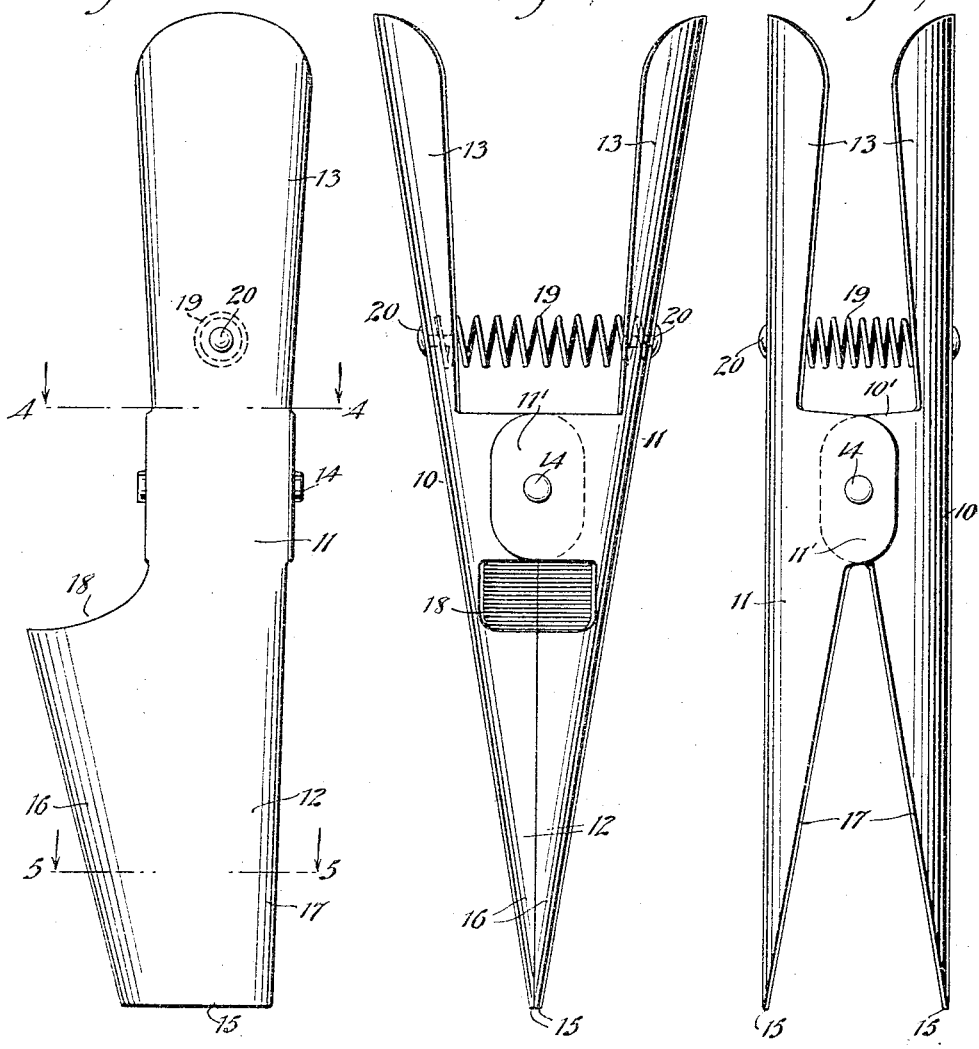

UNITED STATES PATENT OFFICE.

ARTHUR W. REEKS, OF UPPER MONTCLAIR, NEW JERSEY.

PLANT-SETTER.

1,288,194.   Specification of Letters Patent.   Patented Dec. 17, 1918.

Application filed September 23, 1918. Serial No. 255,266.

*To all whom it may concern:*

Be it known that I, ARTHUR W. REEKS, a subject of the King of England, and a resident of Upper Montclair, in the county of Essex and State of New Jersey, have invented a new and Improved Plant-Setter, of which the following is a full, clear, and exact description.

This invention relates to horticultural apparatus, and has particular reference to garden tools for the handling of small or young plants.

Among the objects of the invention is to provide a hand tool of novel and simple construction for the purpose of setting or transplanting young plants, having in view the least possible disturbance of the delicate rootlets of such plants, and whereby a plant may be transplanted without it being subjected to the shock that is so commonly incident to the transplanting of plants where the dirt is loosened or lost.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which Figure 1 is a side elevation.

Fig. 2 is a front elevation.

Fig. 3 is a rear elevation with the blades open; and

Figs. 4 and 5 are horizontal sectional details on the corresponding lines of Fig. 1.

Referring now more specifically to the drawings, I show a hand operated tool of the character set forth comprising but two main parts, namely, right and left side parts 10 and 11 respectively, each comprising a blade 12 at its lower end and a handle 13 at its upper end. This tool may be constructed chiefly of sheet metal of relatively cheap nature and so stamped or otherwise formed as to include pairs of parallel overlapping wings 10' and 11' pertaining to the respective side members 10 and 11 through which a single pivot 14 is passed for securing the side parts permanently and pivotally together. Two separate pivots may be employed if desired instead of the single pivot, but in either event they have the same axis.

But for the wings 10' and 11' the side portions are essentially straight from the upper end of the handles to the lower end of the blades, although in cross section these parts are curved or convexed not only for strength and stiffness, but especially for the better manipulation of the plant as will be better seen below.

The lower end 15 of each blade 12 may be described as a chisel edge, and hence is relatively broad and straight parallel to the axis of the pivot 14. Extending upward, however, from the end 15 are two side edges 16 and 17, as shown best in Fig. 5, these edge portions being preferably arcs of circles in said cross sectional view. The blade portions 12, however, are adapted to abut snugly against each other throughout the length of the edge portions 16 and 17 as well as the chisel edges 15 in normal position. The front edge portions 16 of the blades are flared materially from the opposite edge portions 17 and from the vertical longitudinal axis of the entire tool, and so are spaced from the pivot portion thereof providing a large opening 18 at the top through which the stem of the plant may project freely along the front side of the handle while being transported and reset.

In the practice of the invention the tool may be employed to form a hole in the earth to receive the plant. This operation is performed by simply forcing the chisel edges or lower ends of the blades in closed position as in Figs. 1 and 2 directly downward to the desired depth, an expedient easy to perform by reason of the shape of the lower end of the tool. After the tool is inserted in this manner the handles 13 are compressed against the force of any suitable tension member such as a spring 19 fitted between the handles and secured thereto by means of fasteners 20, thus forcing the blades 12 apart as shown in Fig. 3. This action of the blades causes the parting of the earth and the formation of a hole of exactly the size suitable to receive the tool again with the plant. The next step after withdrawing the tool from the hole thus formed is to spread the blades apart on opposite sides of the plant and then force the tool into the bed or box of plants, the edges 15 being separated sufficiently far not to cut or damage the rootlets, and then upon release of the handles the spring will serve to sufficiently compress the earth between the blades in which the plant is located to cause the free separation of this portion of the earth with the plant from the bed. In this manner the plant in its original earth may be safely transported or carried to the hole previously formed to receive it. The blade portion of the tool is then introduced into said previously formed hole and upon spreading apart of the blades the plant with its original dirt will be deposited in the hole practically filling the same. The blades being straight are obviously easily withdrawn without disturbing either the plant or dirt surrounding it. Since the main portions of the blades 12 between the side edge portions 16 and 17 are essentially flat and of which flat portions or planes the edges 15 are elements, two important advantages are obtained: First, the tool is much easier to introduce into firm soil than if the blades were rounded in horizontal section, and, secondly, the form of the hole formed to receive the plant and the corresponding form of earth removed from the original bed with the plant is much more satisfactory not only for the plant itself, but provides a means for removing practically all of the dirt from the original bed or box with the removal of all of the plants. By reason of the hole 18 it is obvious that any desired size of plant may be accommodated, the stem of which will extend upward along the handle portions of the tool but will not be disturbed or injured by the handles or the operator's hand.

I claim:

1. In a plant setter, the combination of two side portions, pivot means connecting the same together permanently, said side portions having blades at their lower ends terminating in straight chisel edges coöperating with each other throughout their length, said blades being longitudinally straight and having meeting front and rear curved edge portions meeting each other in straight lines while the main portions of the blades between the front and rear curved edge portions are essentially flat, and a tension member serving to automatically bring the blade portions into direct contact with each other.

2. The herein described plant setter comprising two side portions, means pivotally connecting said portions together, the lower ends of the side portions constituting blades essentially straight throughout their length but tapered toward their lower ends, the front edge portions of the blades projecting materially forward from the longitudinal center of the tool providing a free opening above the blades for the accommodation of the plant stem, while the dirt surrounding said plant is retained between the blades by the edge portions thereof, and a resilient tension member acting to force the blades toward each other.

ARTHUR W. REEKS.

Copies of this patent may be obtained for five cents each, by addressing the "Commissioner of Patents, Washington, D. C."